US010234536B2

United States Patent
Luna, Jr. et al.

(10) Patent No.: US 10,234,536 B2
(45) Date of Patent: Mar. 19, 2019

(54) ADS-B GEOLOCATION

(71) Applicant: Link Labs, Inc., Annapolis, MD (US)

(72) Inventors: Ricardo Luna, Jr., Las Cruces, NM (US); Adrian Sapio, Mount Airy, MD (US); Richard Kevin Sawyer, Jr., University Park, MD (US); Mark Olden Bloechl, Elkridge, MD (US)

(73) Assignee: LINK LABS, INC., Annapolis, MD (US)

( * ) Notice: Subject to any disclaimer, the term of this patent is extended or adjusted under 35 U.S.C. 154(b) by 652 days.

(21) Appl. No.: 14/953,419

(22) Filed: Nov. 29, 2015

(65) Prior Publication Data
US 2017/0153323 A1    Jun. 1, 2017

(51) Int. Cl.
*G01S 5/02* (2010.01)
*G01S 5/10* (2006.01)

(52) U.S. Cl.
CPC .............. *G01S 5/0278* (2013.01); *G01S 5/02* (2013.01); *G01S 5/0294* (2013.01); *G01S 5/10* (2013.01)

(58) Field of Classification Search
CPC ........ G01S 5/02; G01S 5/0278; G01S 5/0294; G01S 5/10
See application file for complete search history.

(56) References Cited

U.S. PATENT DOCUMENTS

| | | | | |
|---|---|---|---|---|
| 2009/0027254 A1* | 1/2009 | Troxel | ................. | H04L 25/062 342/30 |
| 2010/0138184 A1* | 6/2010 | Fernandez | ............... | G01S 5/02 702/150 |
| 2010/0309051 A1* | 12/2010 | Moshfeghi | ............ | H04W 4/029 342/378 |
| 2012/0262339 A1* | 10/2012 | Garcia | ..................... | G01S 5/10 342/387 |

(Continued)

OTHER PUBLICATIONS

Bandpass Filter. (1999). In Newnes Dictionary of Electronics, Newnes (4th ed.). Oxford, UK: Elsevier Science & Technology. Retrieved from https://search.credoreference.com/content/entry/bhelec/bandpass_filter/0 (Year: 1999).*

(Continued)

*Primary Examiner* — Bernarr E Gregory
*Assistant Examiner* — Fred H Mull
(74) *Attorney, Agent, or Firm* — Charles B. Lobsenz; Brian H. Buck; Potomac Law Group, PLLC

(57) ABSTRACT

A method of geolocating comprises: receiving wirelessly, at an asset located on the Earth's surface and from at least two airborne aircraft, ADS-B signals, respectively; interpolating, using a Bayes filter, at least some state information of the at least two airborne aircraft based on the ADS-B signals, respectively; determining differences in received signal strength indicator (RSSI) values (RSSI-difference values) of successive aircraft-specific ADS-B signals, respectively; estimating, using a likelihood function, locations of the asset based on the RSSI-difference values, the ADS-B signals and (Continued)

the interpolated state information, respectively, thereby producing a set of estimated locations; and searching amongst the set to find one of the estimated locations that is regarded as being most likely to most accurately describe an actual position of the asset.

40 Claims, 10 Drawing Sheets

(56) References Cited

U.S. PATENT DOCUMENTS

| | | | | |
|---|---|---|---|---|
| 2013/0120183 | A1* | 5/2013 | Revol | G01S 5/021 342/37 |
| 2014/0153632 | A1* | 6/2014 | Malaga | H04L 25/4902 375/239 |
| 2016/0035226 | A1* | 2/2016 | Kejik | H04W 4/06 342/40 |
| 2016/0155342 | A1* | 6/2016 | Gibson | G01S 5/0294 701/409 |

OTHER PUBLICATIONS

Envelope detector. (1999). Newnes Dictionary of Electronics, Newnes (4th ed.). Oxford, UK: Elsevier Science & Technology. Retrieved from https://search.credoreference.com/content/entry/bhelec/envelope_detector/0 (Year: 1999).*

Quadrature detector. (1999). Newnes Dictionary of Electronics, Newnes (4th ed.). Oxford, UK: Elsevier Science & Technology. Retrieved from https://search.credoreference.com/content/entry/bhelec/quadrature_detector/0 (Year: 1999).*

Wavelet transform. (2001). Hargrave's Communications Dictionary, Wiley. Hoboken, NJ: Wiley. Retrieved from https://search.credoreference.com/content/entry/hargravecomms/wavelet_transform/0 (Year: 2001).*

Airservices Australia, How ADS-B works, http://www.airservicesaustralia.com/projects/ads-b/how-ads-b-works, Sep. 2015 (Year: 2015).*

"Understanding mode S technology," Wes Stamper, "Defense Electronics," pp. 18-25, Dec. 5, 2005, URL= http://defenseelectronicsmag.com/systems-amp-subsystems/understanding-mode-s-technology.

"ADS-B for Dummies-1090-ES v04," European Organisation for the Safety of Air Navigation ("Eurocontrol"), URL= www.ssd.dhmi.gov.tr/getBinaryFile.aspx?Type=3&dosyaID=195, May 13, 2015.

"LabVIEW Based ADS-B Receiver and Decoder," Washington University (St. Louis), Sep. 27, 2015, URL= http://ese.wustl.edu/ContentFiles/Research/UndergraduateResearch/CompletedProjects/WebPages/sp12/Ignacio/ADS-B%20Poster.pdf.

"Bayesian Filters for Location Estimation," Dieter Fox et al., "IEEE Pervasive Computing," Jul.-Sep. 2003, pp. 24-33, URL= http://www.hightowerweb.org/pubs/fox2003bayesian/fox2003bayesian.pdf.

"Location Estimation using Extended Kalman Filter in CSS WPAN," Yoon-Seok Nam, Proceedings, 1st Internat. Conf. on Convergence and it's Applications ("ICCA"), Advanced Science and Technology Letters ("ASTL"), vol. 24, pp. 199-202, Jul. 2013, URL= http://onlinepresent.org/proceedings/vol24_2013/53.pdf.

"Mode S Today, A Slow Adoption," excerpted from "The Story of Mode S: An Air Traffic Control Data-Link Technology, Background," Emily Chang et al., Dec. 6, 2000, URL= http://web.mit.edu/6.933/www/Fall2000/mode-s/today.html.

* cited by examiner

ADS-B GEOLOCATION

FIELD OF THE DISCLOSURE

Embodiments of the present invention relate to methods of geolocating using ADS-B signals and apparatuses therefor, respectively.

BACKGROUND

The Global Positioning System (GPS) is a satellite-based navigation system that provides location and time information anywhere on or near the Earth where there is an unobstructed line of sight to four or more GPS satellites. The GPS was created by and is maintained by the U.S. government. The GPS is freely accessible to anyone with a GPS receiver. Among the many devices which make use of the GPS are aircraft.

Since 2012 (and continuing through 2025), the Federal Aviation Administration (FAA) has been undertaking a wide-ranging transformation of the air transportation system in the U.S.A., in part by implementing the Next Generation Air Transportation System (NextGen). In particular, NextGen will transform the U.S. air transportation system from being ground-based (e.g., active radar) to satellite-based (e.g., the GPS). An aspect of NextGen is that aircraft must become 'ADS-B Out' compliant. Anecdotal evidence suggests that at least a majority of aircraft flying in U.S. airspace is ADS-B compliant as of midway through 2015.

ADS-B (Automatic dependent surveillance-broadcast) is a cooperative surveillance technology in which an aircraft determines its position via the GPS and periodically broadcasts it, thereby facilitating the tracking of the aircraft by others, e.g., air traffic control ground stations (e.g., as a replacement for secondary radar), other aircraft (e.g., to provide situational awareness and facilitate self-separation amongst the aircraft). The term 'ADS-B Out' refers to the broadcasting requirements of an aircraft. ADS-B is: "automatic" in that it requires neither pilot input nor external input; and "dependent" in that it depends on data from the aircraft's navigation system, which itself is dependent (typically, to a substantial extent) upon the GPS. The payload of an ADS-B message can include: aircraft identity; aircraft location (latitude and longitude); aircraft altitude; aircraft heading; and aircraft velocity.

Some research has been conducted relating to a first concept for determining the location of a ground-based, stationary transmitter based on an aircraft's receipt of proprietary signals broadcast from (and initiated by) the stationary transmitter on the Earth's surface. In particular, the first concept is based on determining a Doppler shift in the received proprietary signals. The proprietary signals were configured to facilitate the determination of Doppler shift.

Some research has been conducted relating to a second concept for determining the location of a stationary asset positioned on the Earth' surface using ADS-B signals received by the asset. A premise informing the second concept is that an asset which receives an ADS-B signal must be located somewhere within a circle enclosing all possible locations of the asset (hereinafter, a 'circle of possibilities'). The circle of possibilities is centered on the position of the aircraft (as identified in the ADS-B signal) and has as assumed maximum radius. As successive ADS-B signals are received from the aircraft, the corresponding successive circles of possibilities form a swath of possibilities on a geographic map. The centerline of the swath follows the trajectory of the aircraft. If a few swaths of possibilities are received from a few aircraft having substantially diverse trajectories, then the intersections of the respective swaths yield a refined circle of possibilities. The second technique was relatively inaccurate; with the refined circle of possibilities having a radius of about two miles.

Some research has been proposed relating to a third concept for determining the location of a mobile asset positioned on the Earth' surface using ADS-B signals received by the asset. The third concept refines the second concept by attaching a weighting factor to the received ADS-B signals. In particular, the weighting factor is a particular metric, namely the received signal strength indicator (RSSI), of the ADS-B signal as received by the asset. It is noted that RSSI is a measurement of the power present in a received radio signal, e.g., an instance of an ADS-B signal.

Some research has proposed relating to a fourth concept for determining the location of a mobile asset positioned on the Earth' surface using ADS-B signals received by the asset. In particular, the fourth concept is based on determining a Doppler shift in the received ADS-B signals.

In general, it is known that Bayes filters can probabilistically estimate a dynamic system's state from noisy observations. In location estimation for the Internet of Things (IoT), the state is an object's location, and location sensors provide observations about the state. The state could be a simple 2D position or a complex vector including 3D position, pitch, roll, yaw, and linear and rotational velocities. Bayes filters represent the state at time t by random variables $x_t$. At each point in time, a probability distribution over $x_t$, called belief, $Bel(x_t)$, represents the uncertainty. Bayes filters aim to sequentially estimate such beliefs over the state space conditioned on all information contained in the sensor data.

Kalman filters are a widely used variant of Bayes filters. A Kalman filter is two-step process (a prediction step followed by an update step) that is applied iteratively. In the prediction step, the Kalman filter uses a model to produce estimates of the current state variables, along with their uncertainties. Once the outcome of the next measurement (necessarily corrupted with some amount of error, including random noise) is observed, the estimates (from the prediction step) are updated (in the update step) using a weighted average, with more weight being given to estimates with higher certainty. The algorithm is recursive. An initial prediction by the Kalman filter is based only on initial measurements. Thereafter, the Kalman filter needs only present input measurements, the previously calculated state per se and its corresponding uncertainty matrix; no additional past information is needed.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of geolocating comprising: receiving wirelessly, at an asset located on the Earth's surface and from at least two airborne aircraft, ADS-B signals, respectively; interpolating, using a Bayes filter, at least some state information of the at least two airborne aircraft based on the ADS-B signals, respectively; determining differences in received signal strength indicator (RSSI) values (RSSI-difference values) of successive aircraft-specific ADS-B signals, respectively; estimating, using a likelihood function, locations of the asset based on the RSSI-difference values, the ADS-B signals and the interpolated state information, respectively, thereby producing a set of estimated locations; and searching amongst the set to find one of the estimated locations that is regarded as being most likely to most accurately describe an actual position of the asset.

Another aspect of the present invention provides a device, located on the Earth's surface, for self-geolocating, the device comprising:

an ADS-B receiver configured at least to receive wirelessly, from at least two airborne aircraft, ADS-B signals; a Bayes filter configured at least to interpolate at least some state information of the at least two airborne aircraft based on the ADS-B signals, respectively; an RSSI unit configured to at least determine differences in received signal strength indicator (RSSI) values (RSSI-difference values) of successive received aircraft-specific ADS-B signals, respectively; a position estimator (PE) unit configured at least to estimate, using a likelihood function, locations of the asset based on the RSSI-difference values, the ADS-B signals and the interpolated state information, respectively, thereby producing a set of estimated locations; and a search unit configured at least to search amongst the set to find one of the estimated locations that is regarded as being most likely to most accurately describe an actual position of the asset.

Yet another aspect of the present invention provides a method of geolocating comprising: receiving wirelessly, at an asset located on the Earth's surface and from at least two airborne aircraft, ADS-B signals, respectively; interpolating, using a Bayes filter, at least some otherwise-missing state information of the at least two airborne aircraft based on the ADS-B signals, respectively; determining Doppler Shifts in the ADS-B signals, respectively; estimating, using a likelihood function, locations of the asset based on the Doppler Shift values, the ADS-B signals and the interpolated state information, respectively, thereby producing a set of estimated locations; and searching amongst the set to find one of the estimated locations that is regarded as being most likely to most accurately describe an actual position of the asset.

Yet another aspect of the present invention provides a device, located on the Earth's surface, for self-geolocating, the device comprising: an ADS-B receiver configured at least to receive wirelessly ADS-B signals from at least two airborne aircraft, ADS-B signals; respectively; a Bayes filter configured at least to interpolate the at least some state information of the at least two airborne aircraft based on the ADS-B signals, respectively; a Doppler shift (DS) unit configured at least to determine Doppler Shifts in frequency of successive received aircraft-specific the ADS-B signals, respectively; a position estimator (PE) unit configured at least to estimate, using a likelihood function, locations of the asset based on the Doppler Shifts, the ADS-B signals and the interpolated state information, respectively, thereby producing a set of estimated locations; and a search unit configured at least to search amongst the set to find one of the estimated locations that is regarded as being most likely to most accurately describe an actual position of the asset.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1A:
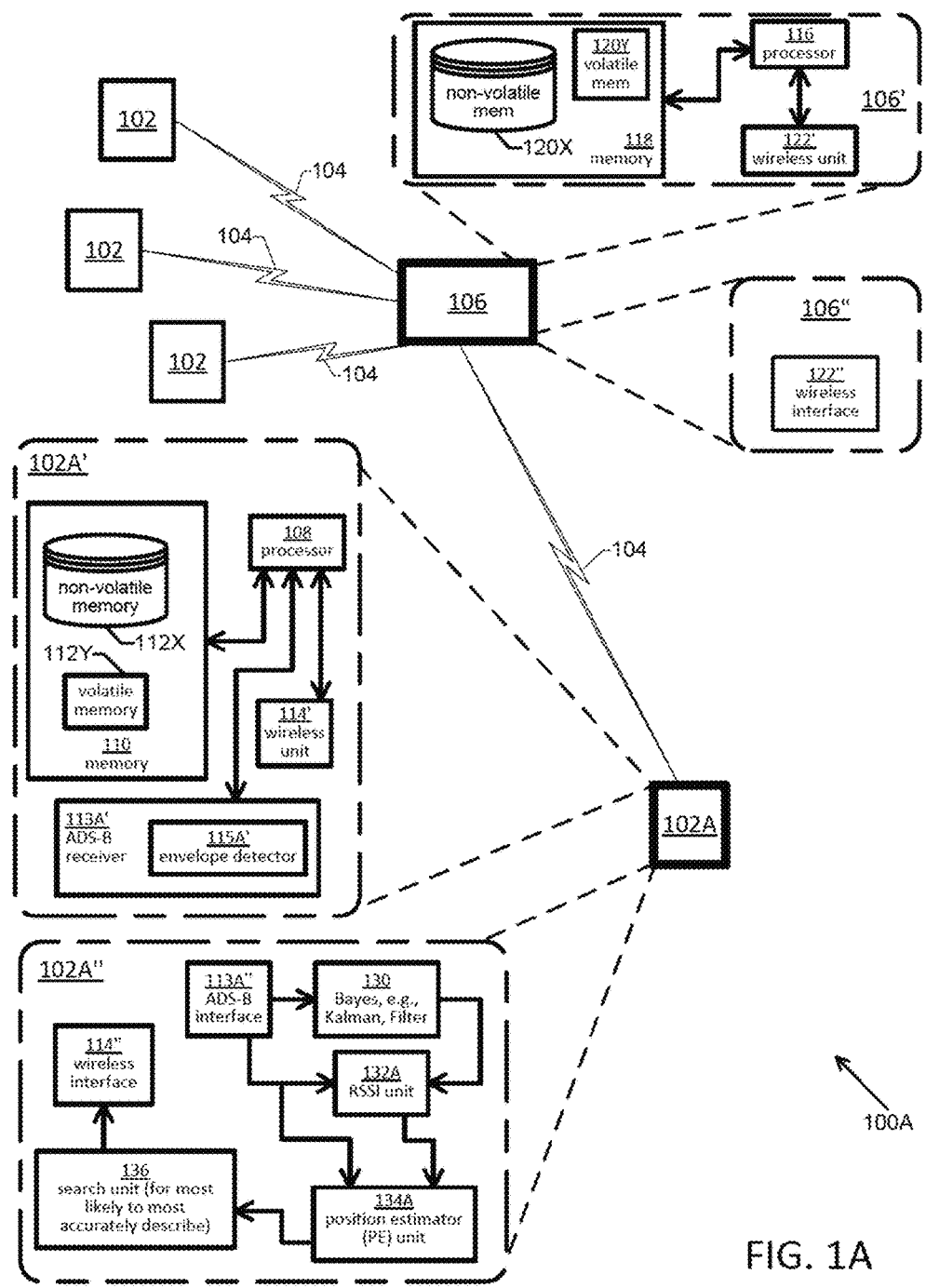
FIG. 1A is a block diagram of a device 102A for self-geolocating according to an embodiment of the present invention.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

FIG. 1A is a block diagram of a device 102A for self-geolocating according to an embodiment of the present invention.

As an example context, self-geolocating device 102A is illustrated as being included in a wireless network 100A, for example, a long-range, low-power network, according to another embodiment of the present invention. FIG. 1A emphasizes physical unit and functional unit configurations.

In FIG. 1A, wireless network 100A can be compatible with a variety of wireless networking techniques, for example, cellular/mobile networking (e.g., Fourth Generation (4G) Long-Term Evolution (LTE), satellite networking (e.g., compatible with the Iridium satellite constellation), the IEEE 802.15.4 standard, low-power & low-bandwidth modulation formats the LoRa™ modulation format, etc. For purposes of a more detailed discussion, at the physical layer, it will be assumed that wireless network 100A is compatible with a low-power & low-bandwidth modulation format network, e.g., the LoRa™ modulation format. The LoRa™ modulation format can be described as a frequency modulated ("FM") chirp that is based on the generation of a stable chirp using a fractional-N ("fracN") phase-locked loop ("PLL"). Core LoRa™ technology is described in U.S. Pat. No. 7,791,415, which is assigned to Semtech™ Corporation.

Network 100A includes nodes, for example: instances of first nodes 102, e.g., end nodes, with device 102A being operative not only as a self-geolocator but also as an equivalent to an instance of end node 102; and a second node 106, e.g., a central node such as a central gateway and/or a base station. Via wireless communication sessions 104, device 102A and instances of end node 102 communicate with central node 106, respectively. As examples, communications from central node 106 to device 102A and instances of end node 102 can include a beacon signal and a configuration signal. Also as an example (and as will be discussed in more detail below), communications from an instance of end node 102 to central node 106 can include a data message. Accordingly, instances of end node 102 can be described as message-sourceable.

In terms of physical components (as illustrated by exploded view 102A'), device 102A includes: one or more instances of a processor 108; memory 110 which itself includes one or more instances of non-volatile memory 112X and one or more instances of volatile memory 112Y; an ADS-B receiver 113A' which can include, e.g., an optional envelope detector 115A'; and a wireless unit 114'. Also, in terms of physical components (as illustrated by exploded view 106'), central node 106 includes: one or more instances of a processor 116; memory 118 which itself includes one or more instances of non-volatile memory 120X and one or more instances of volatile memory 120Y; and a wireless unit 122'.

Each of wireless unit 122' and wireless unit 114' is configured in the form of a transceiver to receive and transmit messages wirelessly, respectively. Overall, the physical components of central node 106 and device 102A, respectively, are operable to engage in (among other things), e.g., LoRaWAN compatible, frequency modulated ("FM") chirp communication that is based on the generation of a stable chirp using a fractional-N ("fracN") phase-locked loop ("PLL") (the PLL not being illustrated). For example, the wireless transmissions can be performed in an unlicensed spectrum.

In terms of functional units (as illustrated by exploded view 102A"), device 102A includes: an ADS-B interface 113A"; a Bayes filter 130 (e.g., a Kalman filter); a received signal strength indicator (RSSI) unit 132A; a position estimator (PE) unit 134A; a search unit 136; and a wireless interface 114". Also, in terms of functional units (as illustrated by exploded view 106"), central node 106 includes a wireless interface 122". For each of central node 106 and device 102A, such functional units can be implemented at least in part, e.g., as executable code stored in one or more of the memories thereof (noted above), with such code being executable by one or more of the processors (noted above), respectively. Such implementations can conform to the communication-layer diagram of FIG. 2 (discussed below).

Figure 1B:
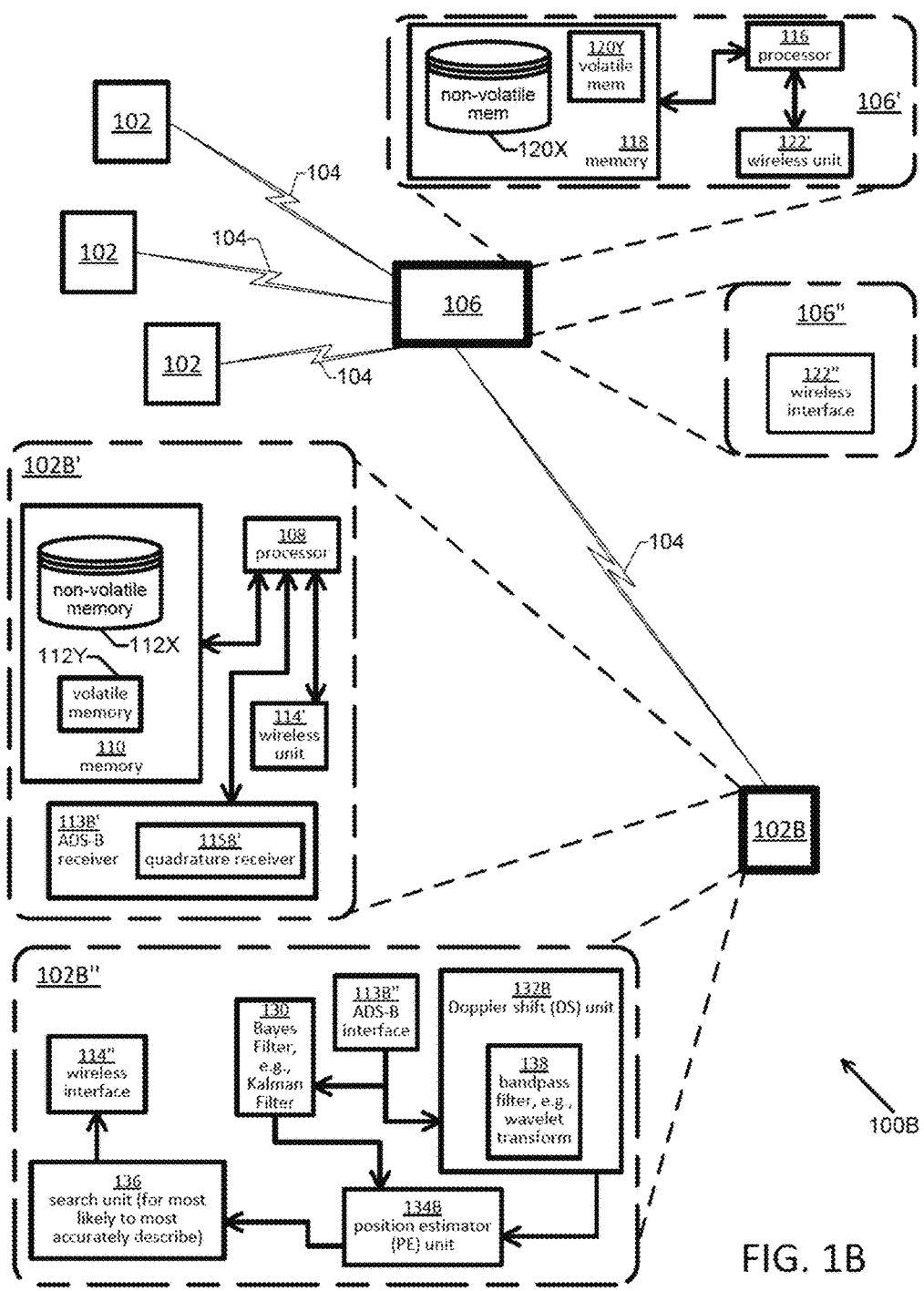
FIG. 1B is a block diagram of a device 102B for self-geolocating according to another embodiment of the present invention.
Figure 2:
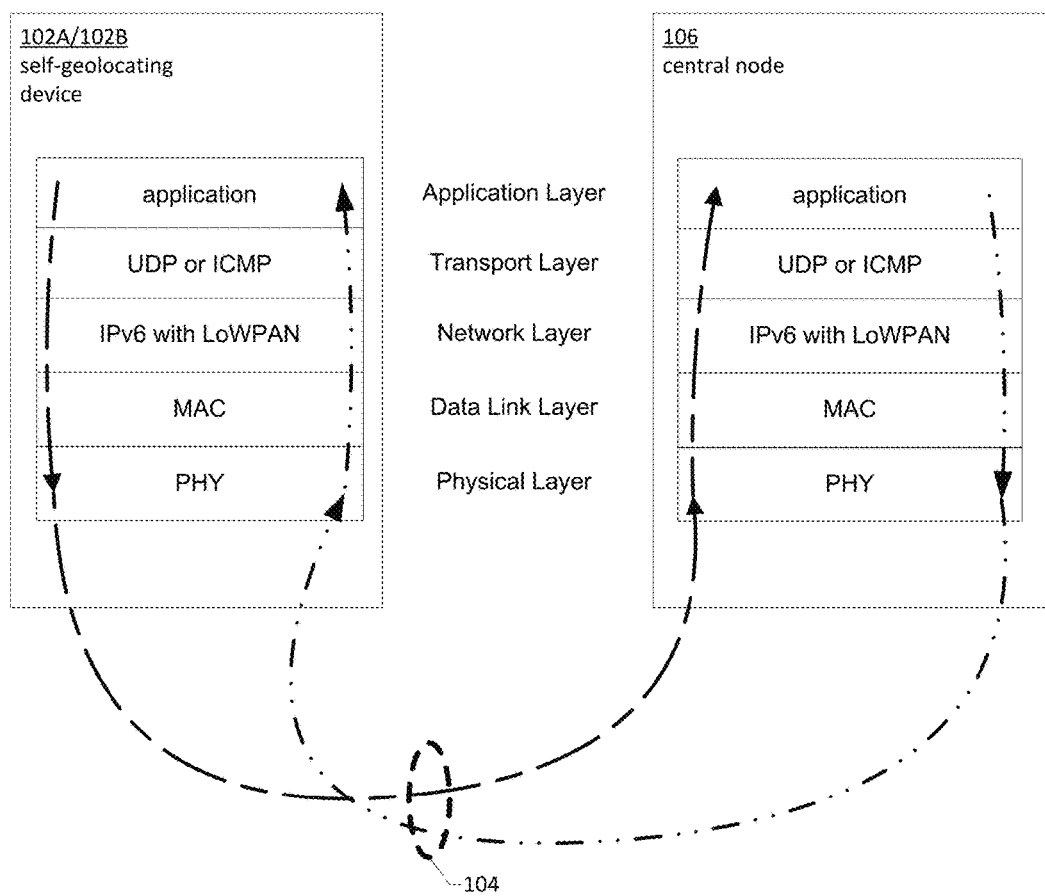
FIG. 2 is a communication-layer diagram illustrating the path of flow during an instance of a communication session between a central node and a self-locating device, according to an embodiment of the present invention.

FIG. 2 is a communication-layer diagram illustrating the path of flow during an instance of communication session 104 between central node 106 and self-geolocating devices 102A and 102B (with device 102B being discussed below in the context of FIG. 1B), according to an embodiment of the present invention.

Central node 106 and devices 102A/102B can be implemented at least in part, e.g., as executable code stored in one or more of the noted (above) memories thereof and executed by one or more of the noted (above) processor units thereof, respectively. Such implementations can conform to the communication-layer diagram of FIG. 2.

More particularly, central node 106 and devices 102A/102B can have a stack based (in part); on industry-standard layers. The layers illustrated in FIG. 2 represent but one example of combinations of layers that can be included in such stacks, respectively. Such layers, from bottom to top, for example (as illustrated in FIG. 2), can include: a physical layer; a data link (or MAC) layer that includes dense acknowledgement messaging-technology (see discussion below); a network layer (e.g., an IP with LoWPAN) layer; a transport layer (e.g., a UDP layer or ICMP layer); and an application layer. Alternatively, different combinations of layers could be used in the stack.

Returning to FIG. 1A, ADS-B receiver 113A' can be implemented in hardware, e.g., including mixers, filters, amplifiers, modulators/demodulators, detectors, etc.). Alternatively, ADS-B receiver 113A' can be implemented, e.g., as a software-defined radio (SDR). In an SDR, components that otherwise typically would have been implemented in hardware (e.g., mixers, filters, amplifiers, modulators/demodulators, detectors, etc.) are instead implemented at least in part, e.g., as executable code stored in one or more of the memories thereof (noted above), with such code being executable by one or more of the processors (noted above), respectively. Such implementations can conform to the communication-layer diagram of FIG. 2 (discussed below). ADS-B signals can include: aircraft identification (ID); airborne position (e.g., latitude, longitude and at least one of barometric altitude or GPS-derived height above the Earth's surface); surface position (e.g., latitude, longitude and aircraft heading); and airborne velocity.

As a simplification for purposes of reducing computational complexity, for example, self-locating device 102A can be assumed to be located substantially on the Earth's surface.

FIG. 1B is a block diagram of a device 102B for self-geolocating according to another embodiment of the present invention.

As an example context, self-geolocating device 102B is illustrated as being included in a wireless network 100B, for example, a long-range, low-power network, according to another embodiment of the present invention. FIG. 1B emphasizes physical unit and functional unit configurations.

In FIG. 1B, wireless network 100B can be compatible with a variety of wireless networking techniques, for example, cellular/mobile networking (e.g., Fourth Generation (4G) Long-Term Evolution (LTE), satellite networking (e.g., compatible with the Iridium satellite constellation), the IEEE 802.15.4 standard, low-power & low-bandwidth modulation formats the LoRa™ modulation format, etc. For purposes of a more detailed discussion, at the physical layer, it will be assumed that wireless network 100B is compatible with a low-power & low-bandwidth modulation format network, e.g., the LoRa™ modulation format, as described above regarding network 100A.

Network 100B includes nodes, for example: instances of first nodes 102, e.g., end nodes, with device 102B being operative not only as a self-geolocator but also as an equivalent to an instance of end node 102; and a second node 106, e.g., a central node such as a central gateway and/or a base station. Via wireless communication sessions 104, device 102B and instances of end node 102 communicate with central node 106, respectively. As examples, communications from central node 106 to device 102B and instances of end node 102 can include a beacon signal and a configuration signal. Also as an example (and as will be discussed in more detail below), communications from an instance of end node 102 to central node 106 can include a data message. Accordingly, instances of end node 102 can be described as message-sourceable.

In terms of physical components (as illustrated by exploded view 102B'), device 102B includes: one or more instances of a processor 108; memory 110 which itself includes one or more instances of non-volatile memory 112X and one or more instances of volatile memory 112Y; an ADS-B receiver 113B' which can include, e.g., an optional quadrature receiver 115B'; and a wireless unit 114'. Also, in terms of physical components (as illustrated by exploded view 106'), central node 106 includes: one or more instances of a processor 116; memory 118 which itself includes one or more instances of non-volatile memory 120X and one or more instances of volatile memory 120Y; and a wireless unit 122'.

Each of wireless unit 122' and wireless unit 114' is configured in the form of a transceiver to receive and transmit messages wirelessly, respectively. Overall, the physical components of central node 106 and device 102B, respectively, are operable to engage in (among other things), e.g., LoRaWAN compatible, frequency modulated ("FM") chirp communication that is based on the generation of a stable chirp using a fractional-N ("fracN") phase-locked loop ("PLL") (the PLL not being illustrated). For example, the wireless transmissions can be performed in an unlicensed spectrum.

In terms of functional units (as illustrated by exploded view 102B"), device 102B includes: an ADS-B interface 113B"; a Bayes filter 130 (e.g., a Kalman filter); a Doppler shift (DS) unit 132B (which itself includes a wavelet transformer 138); a position estimator (PE) unit 134B; a search unit 136; and a wireless interface 114". Also, in terms of functional units (as illustrated by exploded view 106"), central node 106 includes a wireless interface 122". For each of central node 106 and device 102B, such functional units can be implemented at least in part, e.g., as executable code stored in one or more of the memories thereof (noted above), with such code being executable by one or more of the processors (noted above), respectively. Such implementations can conform to the communication-layer diagram of FIG. 2 (discussed below).

ADS-B receiver 113B', like ADS-B receiver 113A', can be implemented in hardware, e.g., including mixers, filters, amplifiers, modulators/demodulators, detectors, etc.). Alternatively (and like ADS-B receiver 113A'), ADS-B receiver 113B' can be implemented, e.g., as a software-defined radio (SDR). In an SDR, components that otherwise typically would have been implemented in hardware (e.g., mixers, filters, amplifiers, modulators/demodulators, detectors, etc.) are instead implemented at least in part, e.g., as executable code stored in one or more of the memories thereof (noted above), with such code being executable by one or more of the processors (noted above), respectively. Such implementations can conform to the communication-layer diagram of FIG. 2 (discussed below).

Self-locating device 102B is assumed to be located substantially on the Earth's surface.

Figure 3:
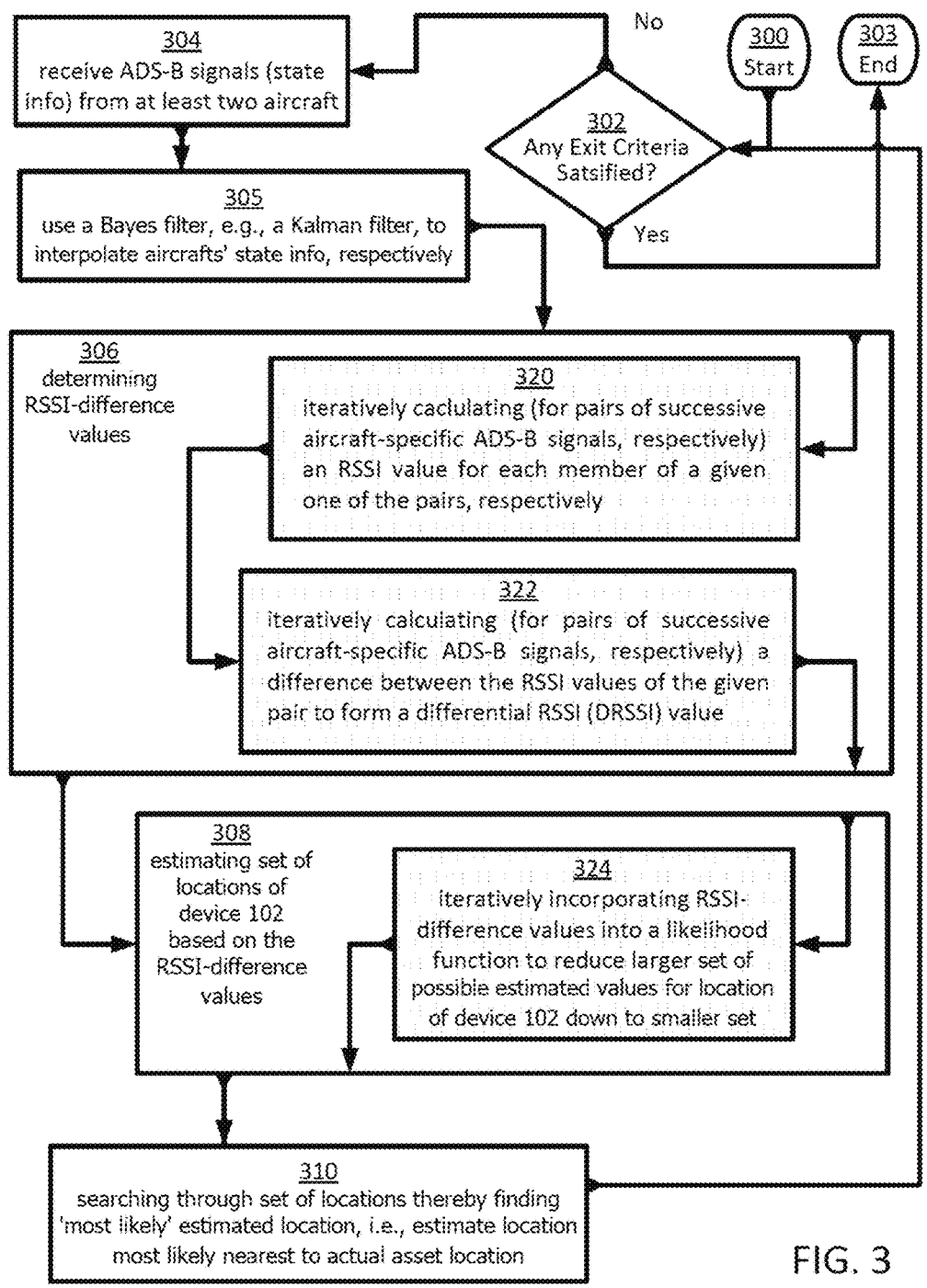
FIG. 3 is a flowchart illustrating a method of self-locating device 102, according to an embodiment of the present invention.

FIG. 3 is a flowchart illustrating a method of self-locating device 102A, according to an embodiment of the present invention.

In FIG. 3, there is a loop. As a general design consideration, no loop should be infinite, i.e., inescapable. Accordingly, flow in FIG. 3 starts at block 300 and proceeds to a decision block 302, where processor 108 decides if any exit criteria have been satisfied. If the outcome of decision block 302 is yes (one or more of the exit criteria are satisfied), then flow proceeds to block 303 and ends. If the outcome of decision block 302 is no (none of the exit criteria has been satisfied), then flow proceeds to a block 304.

At block 304, ADS-B receiver 113A' via envelope detector 115A' receives wirelessly, from at least two airborne aircraft, ADS-B signals. Again, self-locating device 102A (and thus ADS-B receiver 113A' and envelope detector 115A' by inclusion therein) is assumed to be located substantially on the Earth's surface. From block 304, flow proceeds to a block 305.

Again, the payload of an ADS-B signal/message includes state information regarding the aircraft from which the ADS-B signal was emitted. The state information included the payload an ADS-B signal, in particular, can include: aircraft identity; aircraft location (latitude and longitude); aircraft altitude; aircraft heading; and aircraft velocity. Among all of the ADS-B signals emitted by a given aircraft, only a relatively small minority includes position information, whereas the relatively large majority does not include position information. For ADS-B signals in the majority (i.e., which lack position information), however, the missing position information can be interpolated (as in block 305), thereby improving the position-deficient ADS-B signals.

At block 305, Bayes filter 130 (e.g., a Kalman filter) interpolates the state information of the at least two airborne aircraft, respectively, e.g., to provide position information lacking in the majority of ADS-B signals. From block 305, flow proceeds to a block 306.

At block 306, RSSI unit 132A receives the ADS-B signals from ADS-B interface 113K and the interpolated position information from Bayes filter 130, and determines differences in received signal strength indicator (RSSI) values (RSSI-difference values) of successive aircraft-specific ADS-B signals, respectively. From block 306, flow proceeds to a block 308.

At block 308, position estimator (PE) unit 134A estimates, using a likelihood function, locations of end node 102 based on the RSSI-difference values, respectively, thereby producing a set of estimated locations. From block 308, flow proceeds to a block 310.

At block 310, search unit 136 searches amongst the set of estimated locations to find one of the estimated locations that is regarded as being most likely to most accurately describe an actual position of end node 102. Search unit 136 can use one more heuristics, including: a grid-search heuristic; a gradient descent heuristic; or an expectation-maximization heuristic. The grid-search heuristic and the gradient descent heuristic begin at a randomly chosen point or a point chosen on an informed basis, and then proceed according to a grid. By contrast, the expectation-maximization heuristic starts with a Gaussian Mixture Model (GMM), which itself more simply represents the likelihood function mathematically using a mixture of Gaussian distributions. The mixture coefficients are akin to weighting factors which are used for combining the Gaussian distributions.

From block 310, flow proceeds to loop back up to decision block 302 (discussed above).

Within RSSI-difference-determining block 306, for example, flow can proceed as follows. That is, from block 305, flow can proceed to a block 320. At block 320, RSSI unit 132A can determine, for pairs of successive aircraft-specific ADS-B signals, respectively, an RSSI value for each member of a given one of the pairs, respectively. From block 320, flow can proceed to a block 322.

At block 322, RSSI unit 132A can determine (for pairs of successive aircraft-specific ADS-B signals, respectively) a difference between the RSSI values of the given pair to form a differential RSSI (DRSSI) value. From block 322, flow can flow can exit block 306 and proceed to block 308 (discussed above).

Within estimating block 308, for example, flow can proceed as follows. From block 306, flow can proceed to a block 324. At block 324, PE unit 134A can iteratively incorporate the RSSI-difference values into the likelihood function to reduce a size of the set of the estimated set of locations for device 102. From block 324, flow can exit block 308 and proceed to block 310 (discussed above).

Example computations (hereinafter "DRSSI computations") by which blocks 306 (e.g., blocks 320-324) and 308 (e.g., block 324) can be implemented will now be discussed.

ADS-B messages are much louder and at the surface of the earth than GPS, making self-geolocating device 102A well suited for circumstances in which GPS signals are weak, e.g., inside a building, or GPS-denied environments.

Initial Assumptions:
Device 102A is stationary;
Device 102A can simultaneously decode ADS-B position broadcasts and measure RSSI of said broadcast packet;
ADS-B broadcasts transmitted from one aircraft have a substantially constant EIRP; and
Device 102A is located substantially on the ground, i.e., substantially on the Earth's surface.

Symbols and Notation:

TABLE 1

Nomenclature

| SYMBOL | DESCRIPTION | UNITS |
| --- | --- | --- |
| $i \in \{1, 2 \ldots N\}$ | Discrete-Time Index | None. |
| $\theta \in \mathbb{R}^3$ | Actual location of device 102A | Meters, ECEF (a geographic Cartesian coordinate system which assumes origin (0, 0, 0) at center of Earth and is invariant to rotation thereof). |
| $L_i \in \mathbb{R}^3$ | Actual location of aircraft at time i | Meters, ECEF |
| $\Delta L_i \in \mathbb{R}$ | Difference in aircraft location from time index i to i − 1. | Meters |
| $\varphi_i \in \mathbb{R}$ | Angle between the aircraft velocity vector and a ray from the aircraft to device 102A, at time i − 1. | Meters |
| $EIRP_i \in \mathbb{R}$ | EIRP of ADS-B broadcast at time i. | dBm |
| $R_i \in \mathbb{R}$ | RSSI of transmission received at time n. | dBm |
| $\Delta R_i \in \mathbb{R}$ | $R_i - R_{i-1}$ | dBm |

Figure 4A:
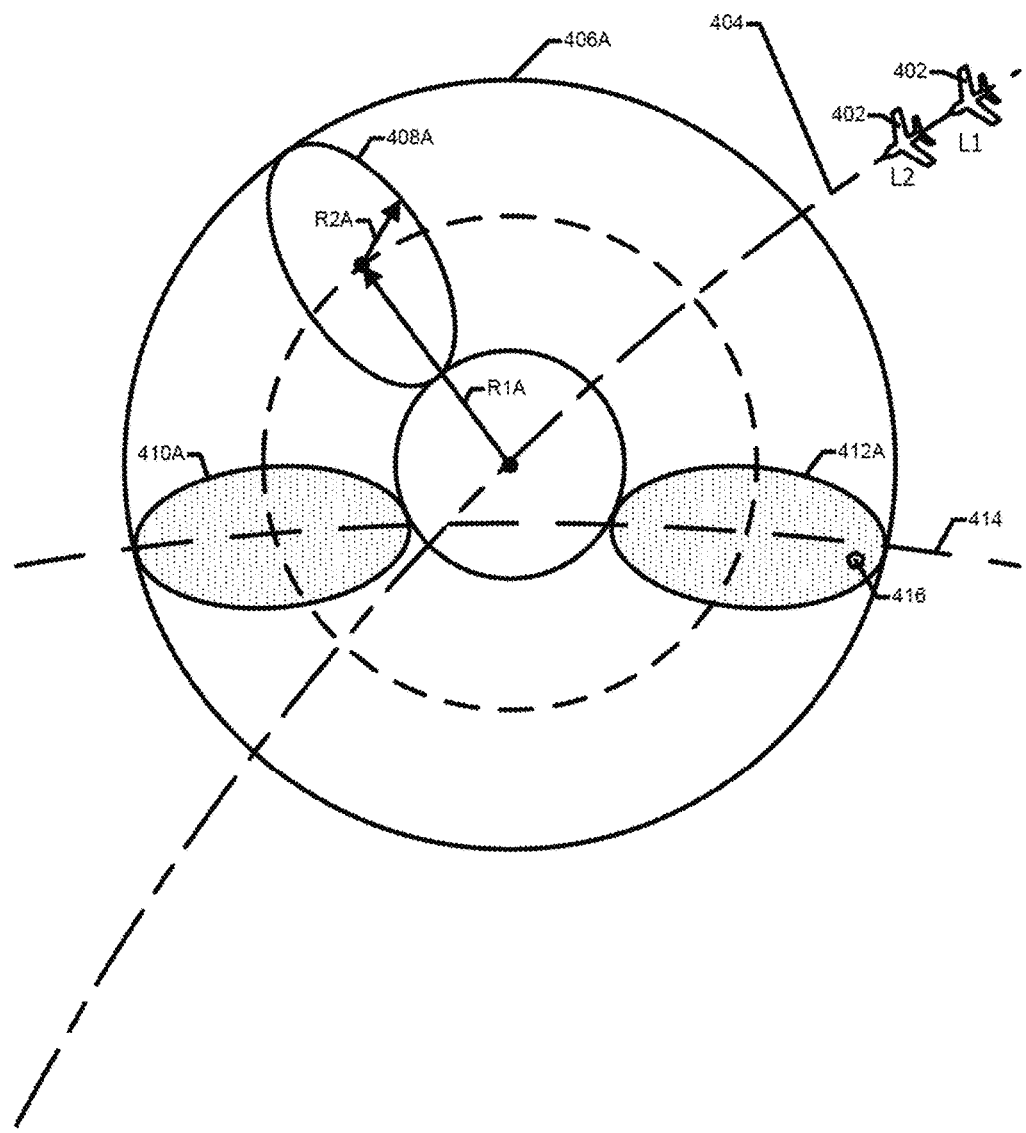
FIGS. 4A-4E illustrate aspects of the DRSSI computations, according to embodiments of the present invention, respectively.
Figure 4B:
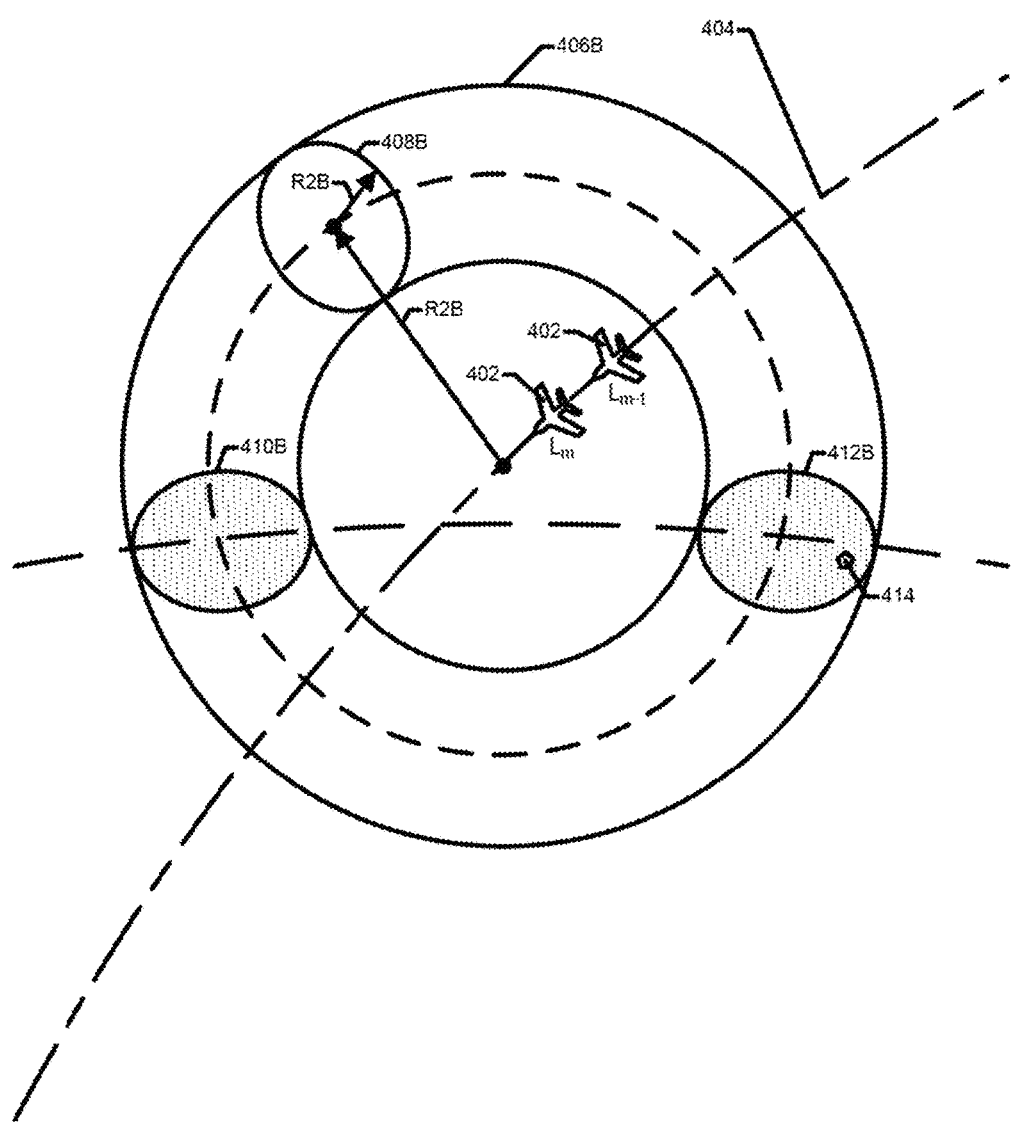
Figure 4C:
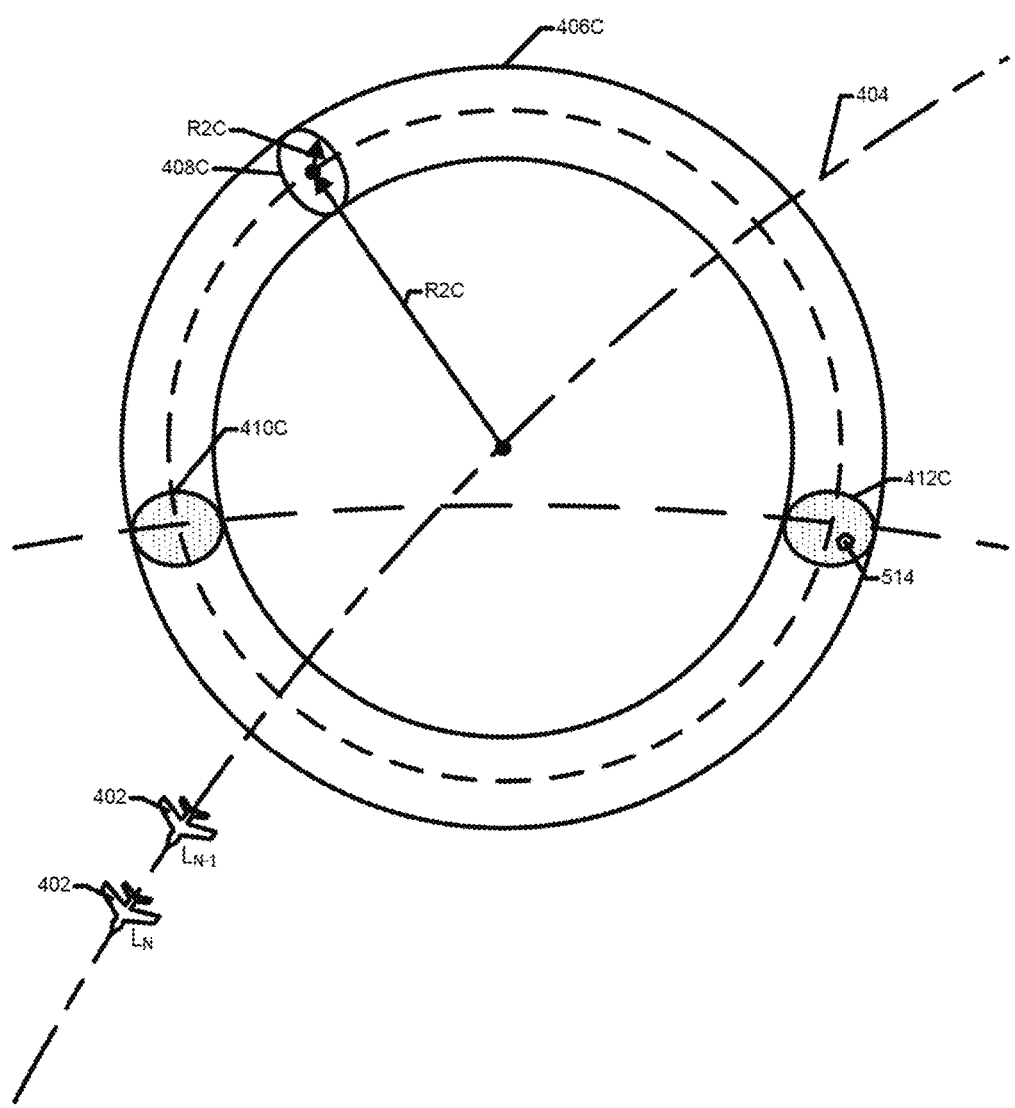
Figure 4D:
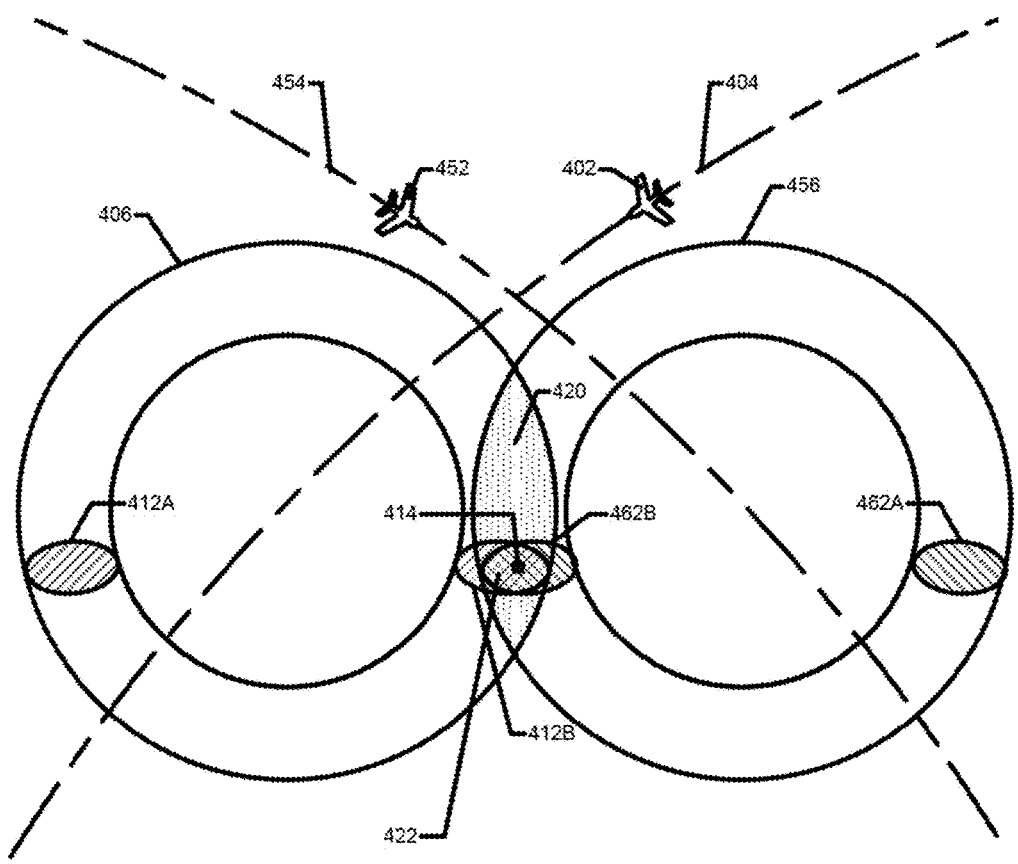
Figure 4E:
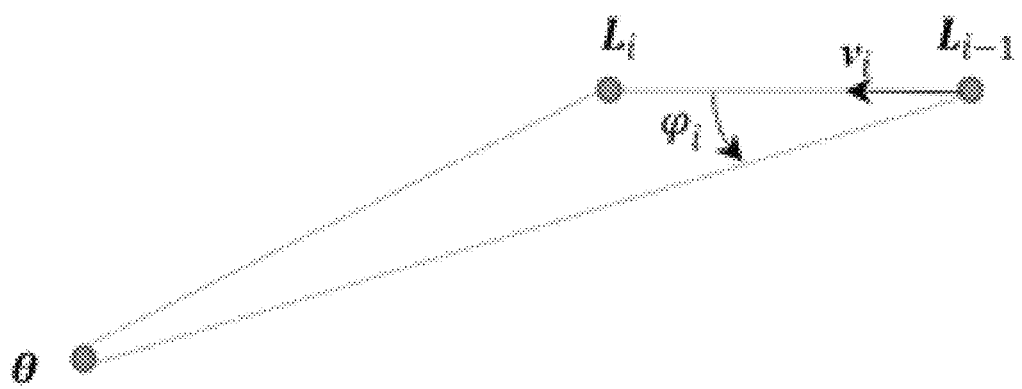

FIG. 4E illustrates the θ, namely the location of device 102A, in relation to aircraft 402 at time i−1 when it is at location $L_{i-1}$ and at time i when it is at location $L_i$.

On average, the RSSI of sequential messages from a given aircraft will increase as the aircraft approaches, and decrease as the aircraft retreats. Measuring RSSI is a relatively simple process and is suitable, e.g., for a low-power receiver, e.g., self-locating device 102A. RSSI measurements are inherently noisy. Accordingly, these calculations can benefit, e.g., heavy reliance on the law of large numbers to converge a solution.

Let PL( ) be a stochastic function that defines the path loss as a function of device 102A location and the aircraft location at a given time index n. For the present time, it will be assumed that all of the variability in the instantaneous path loss is captured by a single Gaussian random variable. The "path loss function" is defined as:

$$PL(\theta, L_i) = a + b \cdot 10 \log_{10}(\|\theta - L_i\|_2) + N_i \quad (1)$$

where $N_i$ is a zero-mean Gaussian random variable with variance $\sigma_{PL}^2$, a is an unknown constant, and b is the path loss coefficient, which is temporarily assumed to equal 2 (free-space path loss).

The next few equations follow from the above:

$$R_i = EIRP_i - PL(\theta, L_i) \quad (2)$$

$$R_{i-1} = EIRP_{i-1} - PL(\theta, L_{i-1}) \quad (3)$$

Assuming $EIRP_i$ an $EIRP_{i-1}$ are equal, then it is not necessary to know the value of $EIRP_{i-1} = EIRP_{i-1}$ because EIRP drops out of a calculation of a difference $\Delta R_i$ as follows:

$$\Delta R_i = R_i - R_{i-1} = PL(\theta, L_{i-1}) - PL(\theta, L_i) \quad (4)$$

$$\Delta R_i = 20 \log_{10}\left(\frac{\|\theta - L_{i-1}\|_2}{\|\theta - L_i\|_2}\right) - N_i + N_{i-1} \quad (5)$$

Not needing to know EIRP is beneficial because EIRP is not part of the information that is included in an ADS-B signal.

Equations (4) and (5) show that the quantity $\Delta R_i$ is observable and is a function of an unobservable parameter θ. Defining $$\mu_{\Delta R, i} = 20 \log_{10}\left(\frac{\|\theta - L_{i-1}\|_2}{\|\theta - L_i\|_2}\right),$$

a likelihood function/estimation can be derived as $$p_{\Delta RSSI|\theta}(\Delta r_i \mid \theta, \mu_{\Delta R, i}) = \frac{1}{\sqrt{4\pi\sigma_{PL}^2}} e^{-\frac{(\Delta r_i - \mu_{\Delta RSSI, i})^2}{4\sigma_{PL}^2}} \quad (6)$$

for a given observation, $\mu_{\Delta R, i}$, and where $\Delta r_i$ is the range of possible values for the DRSSI observation, $\Delta R$. Equation (6) declares that there are many possible solutions such that there are many possible values of θ, i.e., many possible location estimates for device 102. In other words, if one were to make a plot using Equation (6) with $\Delta r_i$ as the independent variable, then the resulting plot would be a single-dimension Gaussian distribution that exhibits a relatively larger variance (as contrasted to Equation (7) discussed below).

Conditional independence between DRSSI observations can be assumed. With each DRSSI observation, Equation (6) can be iterated to produce a new set of results. Because of the conditional independence between DRSSI observations, the iterated results from Equation (6) can be accumulated such that Equation (6) becomes $$p_{\Delta RSSI|\theta}(\Delta r_N \mid \theta, \mu_{\Delta RSSI, 1}, \mu_{\Delta RSSI, 2}, \ldots, \mu_{\Delta RSSI, N}) = \quad (7)$$

$$\prod_{i=1}^{N} p_{\Delta RSSI|\theta}(\Delta r_i \mid \theta, \mu_{\Delta RSSI, i})$$

In effect, Equation (7) multiplies together the multiple sets of results of Equation (6), where (again) sets of results are produced by iterating Equation (6) with each new DRSSI observation. In general, the 'product' resulting from Equation (7) has a relatively smaller variance than a given one of the sets of results produced by the iterations of Equation (6). Consequently, use of Equation (7) achieves more certainty than would be associated with the given one of the sets of results produced by the iterations of Equation (6).

The maximum likelihood function is the value of θ that maximizes the likelihood function, namely equation (7), and can be written as $$\hat{\theta}_{ML} = \underset{\theta}{\operatorname{argmax}} \prod_{i=1}^{N} p_{\Delta R|\theta}(\Delta r_i \mid \theta, \mu_{\Delta R,i}) \quad (8)$$

or equivalently written in logarithmic notation as $$\hat{\theta}_{ML} = \underset{\theta}{\operatorname{argmax}} \sum_{i=1}^{N} \ln p_{\Delta R|\theta}(\Delta r_i \mid \theta, \mu_{\Delta R,i}) \quad (9)$$

Assuming $EIRP_i$ and $EIRP_{i-1}$ are equal, then it is not necessary to know the value of $EIRP_i = EIRP_{i-1}$ because EIRP drops out of a calculation of a difference $\Delta R_i$ as follows:

$$\Delta R_i = R_i - R_{i-1} = PL(\theta, L_{i-1}) - PL(\theta, L_i) \quad (4)$$

$$\Delta R_i = 20 \log_{10}\left(\frac{\|\theta - L_{i-1}\|_2}{\|\theta - L_i\|_2}\right) - N_i + N_{i-1} \quad (5)$$

Not needing to know EIRP is beneficial because EIRP is not part of the information that is included in an ADS-B signal.

Discarding irrelevant parameters (i.e., parameters that do not affect the value of θ which maximizes the likelihood function), the maximum likelihood function can be simplified as:

$$\hat{\theta}_{ML} = \underset{\theta}{\operatorname{argmax}} \sum_{i=1}^{N} (\Delta r_i - \mu_{\Delta R,i})^2 \quad (11)$$

The result of Equation (11) is a single point, i.e., a single value of θ, (where, again, of θ, is the estimated location of device 102).

RSSI measurements are taken over the entire message after it has been decoded.

FIG. 4A illustrates an aspect of the DRSSI computations, according to an embodiment of the present invention.

In particular, FIG. 4A illustrates the outcome of the zeroith ($0^{th}$) iteration of Equation 6, which is a Gaussian distribution that is truncated after approximately one standard deviation. That outcome is represented by a likelihood toroid 406A. In other words, toroid 406A represents the set of all possible estimates of the location of device 102A, with the actual location of device 102 being illustrated in FIG. 4A as a pentagon 416. It is noted that for n=1, Equation 7 simplifies to Equation 6.

Aircraft 402 has a trajectory 404 that passes through the center of toroid 406A. The zeroith ($0^{th}$) iteration is based on only one value of DRSSI, which is obtained as the difference of the RSSI values for the ADS-B signals corresponding to aircraft 402 at locations $L_1$ and $L_2$, respectively, on trajectory 404.

Because it is assumed that device 102A is on the ground, then it can be inferred that possible locations of device 102A are found in the slices 410A and 412A where the surface 414 of the Earth passes through toroid 406A. This inference is referred to as ground-clamping toroid 406A.

Toroid 406A is formed by sweeping a circle 408A of radius R2A through an angular range of 360 degrees about a center point. For example, R2A is approximately 35 kilometers.

FIG. 4B illustrates another aspect of the DRSSI computations, according to an embodiment of the present invention.

In particular, FIG. 4B illustrates the outcome of the $m^{th}$ iteration of Equation 7, for which n is a positive integer and 1<n. It is to be recalled that each iteration of Equation 7 is cumulative. As such, toroid 406B in FIG. 4B is based on m instances of DRSSI. In particular, the $m^{th}$ iteration is obtained as the difference of the RSSI values for the ADS-B signals corresponding to aircraft 402 at locations $L_{m-1}$ and $L_m$, respectively, on trajectory 404.

As of the $m^{th}$ iteration of Equation 7, the volume of toroid 406B has decreased relative to the volume of toroid 406A. With each successive iteration, the volume of toroid 406 will decrease, and consequently slices 410B and 412B are decreased relative to slices 410A and 412A, i.e., R2B<R2A. For example, R2B is approximately 5 kilometers.

FIG. 4C illustrates another aspect of the DRSSI computations, according to an embodiment of the present invention.

In particular, FIG. 4C illustrates the outcome of the last iteration, i.e., the $N^{th}$ iteration, of Equation 7, for which N is a positive integer and m<N. Toroid 406C in FIG. 4C is based on N instances of DRSSI. In particular, the $N^{th}$ iteration is obtained as the difference of the RSSI values for the ADS-B signals corresponding to aircraft 402 at locations $L_{N-1}$ and $L_N$, respectively, on trajectory 404.

As of the $N^{th}$ iteration of Equation 7, the volume of toroid 406C has decreased relative to the volume of toroid 406B. Consequently slices 410C and 412C are decreased relative to slices 410B and 412B, i.e., R2C<R2B. For example, R2C is approximately 25 meters.

It is noted that FIGS. 4A-4C illustrate only one trajectory 404. Consequently, even after toroid 406C is ground-clamped, there remains two slices (namely slices 410C and 412C) that together contain the possible locations of device.

FIG. 4C illustrates another aspect of the DRSSI computations, according to an embodiment of the present invention.

If, however, Equation 7 is iterated for two or more trajectories, then the corresponding toroids 406 will intersect and identify one of the two slices as containing the actual location of device 102A. This result is illustrated in FIG. 4D for two toroids, namely toroid 406 and toroid 456. Toroid 456 is based on trajectory 454 of aircraft 452. Toroids 406 and 456 intersect at region 420. Slices 412B and 462B intersect in region 422. The actual location of device 102A is found within region 422.

Figure 5:
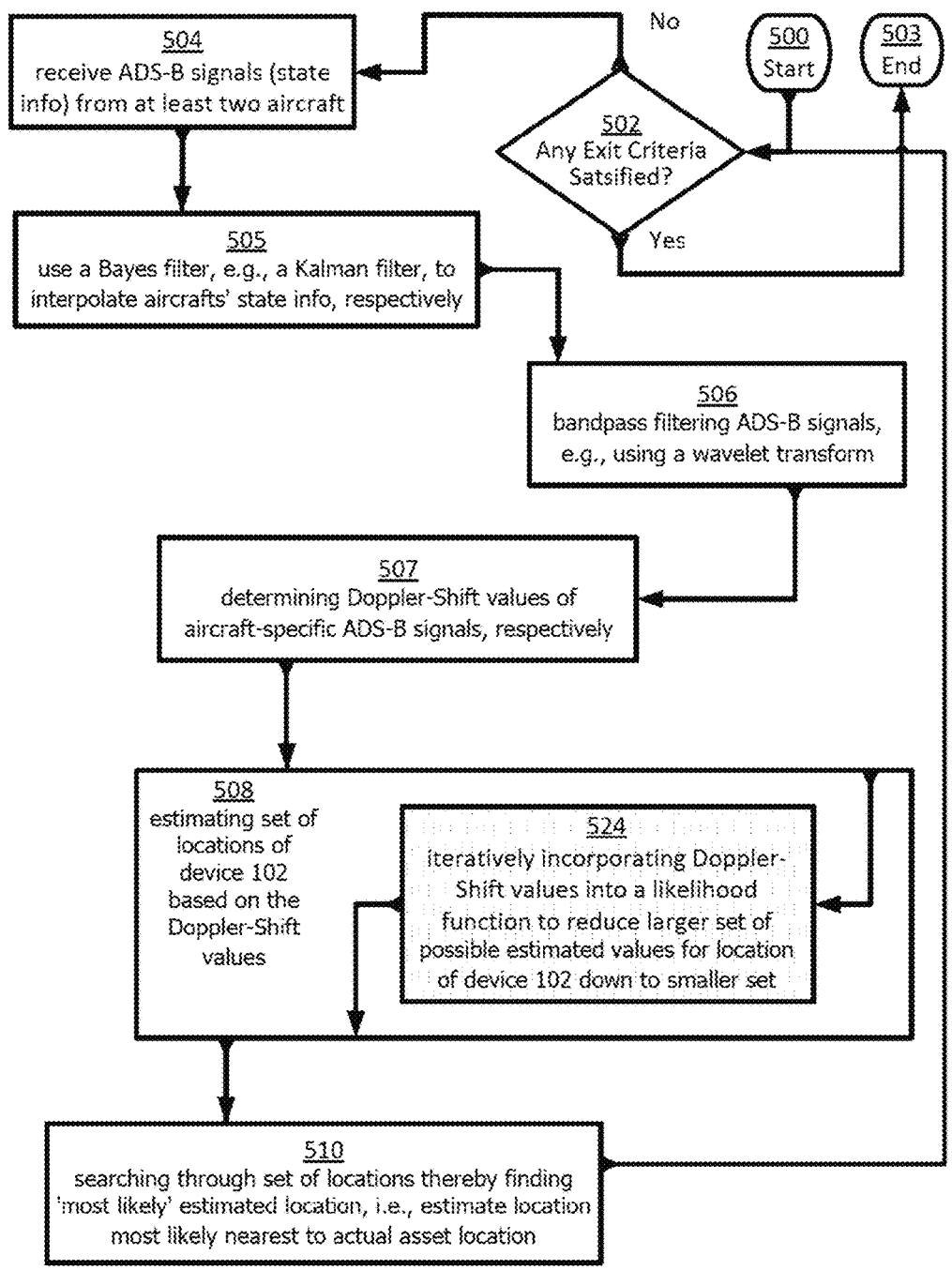
FIG. 5 is a flowchart illustrating a method of self-locating device 102, according to an embodiment of the present invention.

FIG. 5 is a flowchart illustrating a method of self-locating device 102B, according to an embodiment of the present invention.

In FIG. 5, there is a loop. As a general design consideration, no loop should be infinite, i.e., inescapable. Accordingly, flow in FIG. 5 starts at block 500 and proceeds to a decision block 502, where processor 108 decides if any exit criteria have been satisfied. If the outcome of decision block 502 is yes (one or more of the exit criteria are satisfied), then flow proceeds to block 503 and ends. If the outcome of decision block 502 is no (none of the exit criteria has been satisfied), then flow proceeds to a block 504.

At block 504, ADS-B receiver 113B' via quadrature receiver 115B' receives wirelessly, from at least two airborne aircraft, ADS-B signals. Again, self-locating device 102A (and thus ADS-B receiver 113B' and quadrature receiver 115B' by inclusion therein) is assumed to be located substantially on the Earth's surface. From block 504, flow proceeds to a block 505.

Again, the payload of an ADS-B signal/message includes state information regarding the aircraft from which the ADS-B signal was emitted. The state information included the payload an ADS-B signal, in particular, can include: aircraft identity; aircraft location (latitude and longitude); aircraft altitude; aircraft heading; and aircraft velocity. Among all of the ADS-B signals emitted by a given aircraft, only a relatively small minority includes position information, whereas the relatively large majority does not include position information. For ADS-B signals in the majority (i.e., which lack position information), however, the missing position information can be interpolated (as in block 505), thereby improving the position-deficient ADS-B signals.

At block 505, Bayes filter 130 (e.g., a Kalman filter) interpolates the state information of the at least two airborne aircraft, respectively, e.g., to provide position information lacking in the majority of ADS-B signals. From block 505, flow proceeds to a block 506.

At block 506, Doppler shift (DS) unit 132B (via bandpass filter 138) bandpass filters the ADS-B signals from ADS-B interface 113B", e.g., by applying a wavelet transform to the ADS-B signals. For example, such a bandpass filter can be centered on the defined frequency for ADS-B signals, namely 1090 MHz. The bandwidth of the bandpass filter can be, e.g., about 2 KHz. From block 506, flow proceeds to a block 507.

At block 507, Doppler shift (DS) unit 132B operates on the bandpass filtered ADS-B signals to determine Doppler shifts in frequency values of successive aircraft-specific ADS-B signals, respectively. Alternatively, blocks 505-507 could be executed in a difference sequence or in parallel. From block 507, flow proceeds to a block 508.

At block 508, position estimator (PE) unit 134B (1) receives the interpolated position information from Bayes filter 130 and the Doppler shifts from DS unit 132B and (2) operates thereon, respectively, to estimate, using a likelihood function, locations of end node 102 based on the Doppler Shifts, respectively, thereby producing a set of estimated locations. From block 508, flow proceeds to a block 510.

At block 510, search unit 136 searches amongst the set of estimated locations to find one of the estimated locations that is regarded as being most likely to most accurately describe an actual position of end node 102. From block 310, flow proceeds to loop back up to decision block 502 (discussed above). Search unit 136 can use one more heuristics, including: a grid-search heuristic; a gradient descent heuristic; or an expectation-maximization heuristic. The grid-search heuristic and the gradient descent heuristic begin at a randomly chosen point or a point chosen on an informed basis, and then proceed according to a grid. By contrast, the expectation-maximization heuristic starts with a Gaussian matrix Model, which itself more simply represents the likelihood function mathematically using Gaussian distributions. There are mixture coefficients are akin to weighting factors which are used for combining the Gaussian distributions.

From block 510, flow proceeds to loop back up to decision block 502 (discussed above).

Within estimating block 508, for example, flow can proceed as follows. From block 306, flow can proceed to a block 524. At block 524, PE unit 134A can iteratively incorporate the Doppler Shifts into the likelihood function to reduce a size of the set of the estimated set of locations for device 102. From block 524, flow can exit block 508 and proceed to block 510 (discussed above).

Example computations (hereinafter "Doppler computations") by which blocks 506 and 508 (e.g., block 524) can be implemented will now be discussed.

Initial Assumptions:
Device 102B is stationary;
Device 102B can simultaneously decode ADS-B position broadcasts and measure RSSI of said broadcast packet; and
Device 102B is located substantially on the ground, i.e., substantially on the Earth's surface.

Symbols and Notation:

TABLE 2

Nomenclature

| SYMBOL | DESCRIPTION | UNITS |
|---|---|---|
| $i \in \{1, 2 \ldots N\}$ | Discrete-Time Index | None. |
| $\theta \in \mathbb{R}^3$ | Actual location of device 102B | Meters, ECEF (a geographic Cartesian coordinate system which assumes origin (0, 0, 0) at center of Earth and is invariant to rotation thereof). |
| $L_i \in \mathbb{R}^3$ | Actual location of aircraft at time i | Meters, ECEF |
| $\Delta L_i \in \mathbb{R}$ | Difference in aircraft location from time index i to i − 1. | Meters |
| $\varphi_i \in \mathbb{R}$ | Angle between the aircraft velocity vector and a ray from the aircraft to the device 102B, at time i − 1. | Meters |
| $EIRP_i \in \mathbb{R}$ | EIRP of ADS-B broadcast at time i. | dBm |
| $R_i \in \mathbb{R}$ | RSSI of transmission received at time n. | dBm |
| $\Delta R_i \in \mathbb{R}$ | $R_i - R_{i-1}$ | dBm |

Again, FIG. 4E illustrates the θ, namely the location of device 102B, in relation to aircraft 402 at time i−1 when it is at location $L_{i-1}$ and at time i when it is at location $L_i$.

The Doppler computations leverage the Doppler Shift introduced by the dynamics of the system. As the aircraft approaches device 102B, any spectral content emitted by the aircraft will be observed by device 102B to have a positive frequency shift proportional to the radial component of the relative velocity between device 102B and the aircraft. Similarly, as the aircraft retreats, device 102B will observe a negative frequency shift. Determining Doppler Shifts typically provides more reliable information than determining DRSSI values (as discussed above), but determining the former requires relatively more sophisticated hardware and/or is relatively more computationally expensive (which typically consumes relatively more power).

The amount by which the frequency shifts is known as the Doppler frequency, $f_d$, and is calculated for this system as $$f_{d,i} = \frac{\|v_i\| \cos \varphi_i}{c} f_c \qquad (12)$$

where $v_i$ is the velocity vector of the aircraft at time i, $\varphi_i$ is the angle between the velocity vector at time i and a ray from the aircraft to device 102B at time i−1, c is the speed of light in free space, and $f_c$ is the carrier frequency of the ADS-B message which is documented to be 1090 MHz. Velocity vector, $v_i$, can be calculated from the content of decoded ADS-B messages.

It will be assumed that there is zero-mean Gaussian measurement noise with variance $\sigma_D^2$ on Doppler frequency observations. As such, equation (12) becomes $$f_{d,i} = \frac{\|v_i\|\cos\varphi_i}{c} f_c + N \tag{13}$$

where N is drawn from a Normal distribution with zero mean and variance $\sigma_D^2$. Rearranging equation (13) yields $$\cos\varphi_i = \frac{(f_{d,i} + N)}{f_c} \frac{c}{\|v_i\|} \tag{14}$$

$$\cos\varphi_i = \frac{1}{f_c} \frac{c}{\|v_i\|} (f_{d,i} + N) \tag{15}$$

$$\cos\varphi_i = \frac{f_{d,i}}{f_c} \frac{c}{\|v_i\|} + \frac{c}{f_c\|v_i\|} N \tag{16}$$

As defined in Table 1, $\varphi$ also has the relationship $$v_i \cdot (L_{i-1} - \theta) = \|v_i\|\|L_{i-1} - \theta\|\cos\varphi_i \tag{17}$$

$$\cos\varphi_i = \frac{v_i \cdot (L_{i-1} - \theta)}{\|v_i\|\|L_{i-1} - \theta\|} \tag{18}$$

Equations (16) and (18) show that $\cos\varphi_i$ is an observable quantity that is a function of an unobservable parameter $\theta$. Since $\cos\varphi_i$ is a Gaussian random variable with mean $$\mu_{cos,i} = \left[\frac{f_{d,i}}{f_c} \frac{c}{\|v_i\|}\right]$$

and variance $$\sigma_{cos,i}^2 = \left[\frac{c}{f_c\|v_i\|}\right]^2 \sigma_D^2,$$

the likelihood function for $\cos\varphi_i$ becomes $$p_{\cos|\theta}(\cos\varphi_i \mid \theta, \mu_{cos,i}) = \frac{1}{\sqrt{2\pi\sigma_{cos,i}^2}} e^{-\frac{(\cos\varphi_i - \mu_{cos,i})^2}{2\sigma_{cos,i}^2}} \tag{19}$$

As in the DRRSI computations discussed above, conditional independence between observations is assumed, such that Equation (19) becomes $$p_{\cos|\theta}(\cos\varphi_N \mid \theta, \mu_{cos,1}, \mu_{cos,2}, \ldots, \mu_{cos,N}) = \prod_{i=1}^{N} p_{\cos|\theta}(\cos\varphi_i \mid \theta, \mu_{cos,i}) \tag{20}$$

The maximum likelihood function is the value of $\theta$ that maximizes the likelihood functions, namely equation (20) and can be written as $$\hat{\theta}_{ML} = \arg\max_{\theta} \prod_{i=1}^{N} p_{\cos|\theta}(\cos\varphi_i \mid \theta, \mu_{cos,i}) \tag{21}$$

or equivalently written in logarithmic notation as $$\hat{\theta}_{ML} = \arg\max_{\theta} \sum_{i=1}^{N} \ln p_{\cos|\theta}(\cos\varphi_i \mid \theta, \mu_{cos,i}) \tag{22}$$

Finally, Substituting Equation (19) into Equation (22), the maximum likelihood function becomes $$\hat{\theta}_{ML} = \arg\max_{\theta} C1 + \frac{1}{2\sigma_{cos}^2} \sum_{i=1}^{N} (\cos\varphi_i - \mu_{cos,i})^2 \tag{23}$$

Equation (23) assumes observations of $\varphi$, and thus $\cos\varphi$, have a constant variance. Discarding irrelevant parameters, the maximum likelihood function becomes $$\hat{\theta}_{ML} = \arg\max_{\theta} \sum_{i=1}^{N} (\cos\varphi_i - \mu_{cos,i})^2 \tag{24}$$

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of the embodiments explicitly discussed herein, those skilled in the art will appreciate that the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto.

Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of geolocating by an asset located on the Earth's surface in response to receiving ADS-B aircraft signaling at the asset for relay of an actual position of the asset, comprising:
    receiving wirelessly, at the asset located on the Earth's surface and from each of at least two airborne aircraft, one or more pairs of ADS-B signals, respectively, in which
        at least one signal of the one or more pairs of ADS-B signals is free of position information;
    interpolating, using a Bayes filter, at least some state information of the at least two airborne aircraft based on the ADS-B signals, respectively, in which
        the interpolating produces at least the position information not included in the at least one signal;
    determining differences in received signal strength indicator (RSSI) values (RSSI-difference values) of successive aircraft-specific ADS-B signals, respectively;
    estimating, using a likelihood function, locations of the asset based on the RSSI-difference values, the ADS-B signals and the interpolated state information, respectively, thereby producing a set of estimated locations; and
    searching amongst the set to determine one of the estimated locations as being most likely to most accurately describe an actual position of the asset,
    wherein the asset represents a first node of a wireless network, and communicates the actual position of the first node to a second node of the wireless network to inform the second node of the actual position based on the first node having received the ADS-B signals.

2. The method of claim 1, wherein:
    the determining the RSSI-difference (DRSSI) values includes:
        iteratively calculating, for pairs of successive aircraft-specific ADS-B signals, respectively:
            an RSSI value for each member of a given one of the pairs, respectively; and
            a difference between the RSSI values of the given pair thereby to form the corresponding DRSSI value; and
    the estimating includes:
        iteratively refining the set of estimated locations based on the iteratively-calculated DRSSI values.

3. The method of claim 2, wherein the iteratively refining includes:
    determining a Euclidean norm function based on the DRSSI values, respectively.

4. The method of claim 3, wherein the iteratively refining further includes:
    calculating, based on the Euclidean norm function, a likelihood function $p_{\Delta R|\theta}$ as follows:

$$p_{\Delta R|\theta}(\Delta r_i \mid \theta, \mu_{\Delta R,i}) = \frac{1}{\sqrt{4\pi\sigma_{PL}^2}} e^{-\frac{(\Delta r_i - \mu_{\Delta R,i})^2}{4\sigma_{PL}^2}};$$

with:
    DRSSI being renamed as $\Delta R$;
    $\mu_{\Delta R,i}$ representing an expected $i^{th}$ value of $\Delta R$ corresponding to an $i^{th}$ iteration;
    $\theta$ being unobservable and representing an estimated location of the asset;
    $\Delta r_i$ representing a range of possible values for observations of $\Delta R$; and
    $\sigma_{PL}^2$ representing a variance in path loss (PL).

5. The method of claim 4, wherein the iteratively refining further includes:
    assuming conditional independence for the RSSI values for each member of the given one of the pairs of successive aircraft-specific ADS-B signals, respectively; and
    calculating, based on the likelihood function $p_{\Delta R|\theta}(\Delta r_i|\theta, \mu_{\Delta R,i})$, a maximum likelihood estimate $\hat{\theta}_{ML}$ as follows:

$$\hat{\theta}_{ML} = \operatorname*{argmax}_{\theta} \sum_{i=1}^{N} (\Delta r_i - \mu_{\Delta R,i})^2.$$

6. The method of claim 1, wherein the using the Bayes filter includes:
    using, as the Bayes filter, a Kalman filter.

7. The method of claim 1, further comprising:
    wirelessly communicating, from the first node, the actual position of the first node to the second node included in the wireless network.

8. The method of claim 7, wherein the wirelessly communicating the estimated geolocation includes:
    generating signals according to a low-power, low-bandwidth modulation format.

9. The method of claim 1, wherein the searching includes:
    applying, to the set of estimated locations, one or more heuristics including:
    a grid-search heuristic;
    a gradient descent heuristic; or
    an expectation-maximization heuristic.

10. A device which is self-geolocating when located on the Earth's surface in response to receiving ADS-B aircraft signaling at the device for relay of an actual position of the device, the device comprising:
    an ADS-B receiver configured at least to receive wirelessly, from each of at least two airborne aircraft, one or more pairs of ADS-B signals, in which
        at least one signal of the one or more pairs of ADS-B signals is free of position information;

a memory; and
one or more processors configured to execute instructions stored in the memory, and to implement the instructions as each of
  a Bayes filter configured at least to interpolate at least some state information of the at least two airborne aircraft based on the ADS-B signals, respectively, and to thereby produce the position information not included in the at least one signal;
  a RSSI unit configured to at least determine differences in received signal strength indicator (RSSI) values (RSSI-difference values) of successive received aircraft-specific ADS-B signals, respectively;
  a position estimator (PE) unit configured at least to estimate, using a likelihood function, locations of the device based on the RSSI-difference values, the ADS-B signals and the interpolated state information, respectively, thereby producing a set of estimated locations; and
  a search unit configured at least to search amongst the set to determine one of the estimated locations as being most likely to most accurately describe an actual position of the device,
wherein the device represents a first node of a wireless network, and communicates the actual position of the first node to a second node of the wireless network to inform the second node of the actual position based on the first node having received the ADS-B signals.

11. The device of claim 10, wherein:
the RSSI unit is further configured, for pairs of successive aircraft-specific ADS-B signals, respectively, to at least iteratively calculate:
  an RSSI value for each member of a given one of the pairs, respectively; and
  a difference between the RSSI values of the given pair thereby to form the corresponding DRSSI value, respectively; and
iteratively refine the set of estimated locations based on the iteratively-calculated DRSSI values.

12. The device of claim 11, wherein the PE unit is further configured at least to:
determine a Euclidean norm function based on the DRSSI values, respectively.

13. The device of claim 12, wherein the PE unit is further configured at least to:
calculate, based on the Euclidean norm function, a likelihood function $p_{\Delta R|\theta}$ as follows:

$$p_{\Delta R|\theta}(\Delta r_i \mid \theta, \mu_{\Delta R,i}) = \frac{1}{\sqrt{4\pi \sigma_{PL}^2}} e^{-\frac{(\Delta r_i - \mu_{\Delta R,i})^2}{4\sigma_{PL}^2}};$$

with:
DRSSI being renamed as $\Delta R$;
$\mu_{\Delta R,i}$ representing an expected $i^{th}$ value of $\Delta R$ corresponding to an $i^{th}$ iteration
$\theta$ being unobservable and representing an estimated location of the asset;
$\Delta r_i$ representing a range of possible values for observations of $\Delta R$; and
$\sigma_{PL}^2$ representing a variance in path loss (PL).

14. The device of claim 13, wherein the PE unit is further configured at least to:

assume conditional independence for the RSSI values for each member of the given one of the pairs of successive aircraft-specific ADS-B signals, respectively; and
calculate, based on the likelihood function $p_{\Delta R|\theta}(\Delta r_i|\theta, \mu_{\Delta R,i})$, a maximum likelihood estimate $\hat{\theta}_{ML}$ as follows:

$$\hat{\theta}_{ML} = \underset{\theta}{\mathrm{argmax}} \sum_{i=1}^{N} (\Delta r_i - \mu_{\Delta R,i})^2.$$

15. The device of claim 10, wherein:
the Bayes filter is configured as a Kalman filter.

16. The device of claim 10, wherein:
the first node comprises a wireless transceiver configured at least to receive and transmit messages, respectively, and at least to wirelessly communicate the actual position of the first node to the second node included in the wireless network.

17. The device of claim 16, wherein the wireless transceiver is further configured at least to:
generate signals according to a low-power, low-bandwidth modulation format.

18. The device of claim 10, wherein the ADS-B receiver includes:
an envelope detector.

19. The device of claim 10, wherein the search unit is further configured at least to:
apply, to the set of estimated locations, one or more heuristics including:
  a grid-search heuristic;
  a gradient descent heuristic; or
  an expectation-maximization heuristic.

20. A method of geolocating by an asset located on the Earth's surface in response to receiving ADS-B aircraft signaling at the asset for relay of an actual position of the asset, comprising:
receiving wirelessly, at the asset located on the Earth's surface and from each of at least two airborne aircraft, one or more pairs of ADS-B signals, respectively, in which
  at least one signal of the one or more pairs of ADS-B signals is free of position information;
interpolating, using a Bayes filter, at least some state information of the at least two airborne aircraft based on the ADS-B signals, respectively, in which
  the interpolating produces at least the position information not included in the at least one signal;
determining Doppler Shifts in the ADS-B signals, respectively;
estimating, using a likelihood function, locations of the asset based on the Doppler Shift values, the ADS-B signals and the interpolated state information, respectively, thereby producing a set of estimated locations; and
searching amongst the set to find determine one of the estimated locations that is regarded as being most likely to most accurately describe the actual position of the asset,
wherein the asset represents a first node of a wireless network, and communicates the actual position of the first node to a second node of the wireless network to inform the second node of the actual position based on the first node having received the ADS-B signals.

21. The method of claim 20, further comprising:
bandpass-filtering the ADS-B signals, respectively;

wherein the estimating is based on the bandpass-filtered ADS-B signals.

22. The method of claim 21 wherein the bandpass filtering includes:
applying a wavelet transformation to the ADS-B signals, respectively.

23. The method of claim 20, wherein the estimating includes:
determining a Euclidean norm function based on the Doppler Shifts, respectively.

24. The method of claim 23, wherein the estimating further includes:
calculating, based on the Euclidean norm function, a likelihood function $p_{cos|\theta}$ as follows:

$$p_{cos|\theta}(\cos\varphi_i \mid \theta, \mu_{cos,i}) = \frac{1}{\sqrt{2\pi\sigma_{cos,i}^2}} e^{-\frac{(\cos\varphi_i - \mu_{cos,i})^2}{2\sigma_{cos,i}^2}};$$

with:
$\theta$ being an unobservable parameter and representing an estimated location of the asset;
$\cos\varphi_i$ representing a range of possible values for cosine of angle $\varphi_i$, relating aircraft position and observed Doppler shift and being a Gaussian random variable that has a mean $\mu_{cos,i}$ and a variance $\sigma_{cos,i}^2$;
the mean $\mu_{cos,i}$ being $$\mu_{cos,i} = \left[\frac{f_{d,i}}{f_c} \frac{c}{\|v_i\|}\right];$$

$f_{d,i}$ representing an $i^{th}$ Doppler Shift;
$v_i$ being a velocity vector of the aircraft at a time i;
$\varphi_i$ being an angle between the velocity vector at the time i and a ray from the aircraft to device 102B at time i−1;
c being the speed of light in free space;
$f_c$ being a carrier frequency of the ADS-B signal; and
the variance $\sigma_{cos,i}^2$ being $$\sigma_{cos,i}^2 = \left[\frac{c}{f_c\|v_i\|}\right]^2 \sigma_D^2.$$

25. The method of claim 24, wherein the estimating further includes:
assuming conditional independence for the frequency values of successive aircraft-specific ADS-B signals, respectively; and
calculating, based on the likelihood function $p_{cos|\theta}$, a maximum likelihood estimate $\hat{\theta}_{ML}$ as follows:

$$\hat{\theta}_{ML} = \underset{\theta}{\operatorname{argmax}} \sum_{i=1}^{N} (\cos\varphi_i - \mu_{cos,i})^2.$$

26. The method of claim 20, wherein the using the Bayes filter includes:
using, as the Bayes filter, a Kalman filter.

27. The method of claim 20, further comprising:
wirelessly communicating, from the first node, the actual position of the first node to the second node included in the wireless network.

28. The method of claim 27, wherein the wirelessly communicating the estimated geolocation includes:
generating signals according to a low-power, low-bandwidth modulation format.

29. The method of claim 20, wherein the searching includes:
applying, to the set of estimated locations, one or more heuristics including:
a grid-search heuristic;
a gradient descent heuristic; or
an expectation-maximization heuristic.

30. A device which is self-geolocating when located on the Earth's surface in response to receiving ADS-B aircraft signaling at the device for relay of an actual position of the device, the device comprising:
an ADS-B receiver configured at least to receive wirelessly ADS-B signals from each of at least two airborne aircraft, respectively, in which
at least one signal of the one or more pairs of ADS-B signals is free of position information;
a memory; and
one or more processors configured to execute instructions stored in the memory, and to implement the instructions as each of
a Bayes filter configured at least to interpolate at least some state information of the at least two airborne aircraft based on the ADS-B signals, respectively, and to thereby produce the position information not included in the at least one signal;
a Doppler shift (DS) unit configured at least to determine Doppler Shifts in the ADS-B signals, respectively;
a position estimator (PE) unit configured at least to estimate, using a likelihood function, locations of the device based on the Doppler Shifts, the ADS-B signals and the interpolated state information, respectively, thereby producing a set of estimated locations; and
a search unit configured at least to search amongst the set to determine one of the estimated locations as being most likely to most accurately describe an actual position of the device,
wherein the device represents a first node of a wireless network, and communicates the actual position of the first node to a second node of the wireless network to inform the second node of the actual position based on the first node having received the ADS-B signals.

31. The device of claim 30, further comprising:
a bandpass filter for the ADS-B signals, respectively;
wherein the PE unit is further configured at least to estimate based on the bandpass-filtered ADS-B signals.

32. The device of claim 31, wherein the bandpass filter is configured at least to:
apply a wavelet transformation to the ADS-B signals, respectively.

33. The device of claim 30, wherein the PE unit is further configured at least to:
determine a Euclidean norm function based on the Doppler Shifts, respectively.

34. The device of claim 33, wherein the PE unit is further configured at least to:
calculate, based on the Euclidean norm function, a likelihood function $p_{cos|\theta}$ as follows:

$$p_{\cos|\theta}(\cos\varphi_i \mid \theta, \mu_{\cos,i}) = \frac{1}{\sqrt{2\pi\sigma_{\cos,i}^2}} e^{-\frac{(\cos\varphi_i - \mu_{\cos,i})^2}{2\sigma_{\cos,i}^2}};$$

with:
- θ being an unobservable parameter and representing an estimated location of the asset;
- cos φ$_i$ representing a range of possible values for cosine of angle φ$_i$, relating aircraft position and observed Doppler shift and being a Gaussian random variable that has a mean μ$_{cos,i}$ and a variance σ$_{cos,i}^2$;
- the mean μ$_{cos,i}$ being $$\mu_{\cos,i} = \left[\frac{f_{d,i}}{f_c} \frac{c}{\|v_i\|}\right];$$

- f$_{d,i}$ representing an i$^{th}$ Doppler Shift;
- v$_i$ being a velocity vector of the aircraft at a time i;
- φ$_i$ being an angle between the velocity vector at the time i and a ray from the aircraft to device 102B at time i−1;
- c being the speed of light in free space;
- f$_c$ being a carrier frequency of the ADS-B signal; and
- the variance σ$_{cos,i}^2$ being $$\sigma_{\cos,i}^2 = \left[\frac{c}{f_c\|v_i\|}\right]^2 \sigma_D^2.$$

35. The device of claim 34, wherein the PE unit is further configured at least to:

assume conditional independence for the frequency values of successive aircraft-specific ADS-B signals, respectively; and calculating, based on the likelihood function p$_{cos|\theta}$, a maximum likelihood estimate θ̂$_{ML}$ as follows:

$$\hat{\theta}_{ML} = \underset{\theta}{\operatorname{argmax}} \sum_{i=1}^{N} (\cos\varphi_i - \mu_{\cos,i})^2.$$

36. The device of claim 30, wherein:
the Bayes filter is configured as a Kalman filter.

37. The device of claim 30, further comprising:
the first node comprises a wireless transceiver configured at least to receive and transmit messages, respectively, and at least to wirelessly communicate the actual position of the first node to the second node included in the wireless network.

38. The device of claim 37, wherein the wireless transceiver is further configured at least to:
generate signals according to a low-power, low-bandwidth modulation format.

39. The device of claim 30, wherein the ADS-B receiver includes:
a quadrature receiver.

40. The device of claim 30, wherein the search unit is further configured at least to:
apply, to the set of estimated locations, one or more heuristics including:
a grid-search heuristic;
a gradient descent heuristic; or
an expectation-maximization heuristic.

* * * * *